Patented Dec. 26, 1939

2,185,153

UNITED STATES PATENT OFFICE 2,185,153

STABLE ICE COLOR PRODUCING COMPOSITIONS

Hans Z. Lecher, Plainfield, and Henry Philip Orem, North Plainfield, N. J., assignors, by mesne assignments, to American Cyanamid Company, New York, N. Y., a corporation of Maine No Drawing. Application August 9, 1939, Serial No. 289,180

10 Claims. (Cl. 8—45)

This invention relates to the art of dyeing and printing ice colors. It relates also to new dye producing compositions and the processes for applying them on materials, particularly textile materials.

More specifically, the present invention relates to compositions comprising an ice color coupling component and a stabilized diazo compound. The stabilized diazo compounds used in this invention are made from diazo components free from solubilizing groups, and from saturated guanidyl sulfonic acids having at least two carbon atoms between the guanidine radical and the nearest sulfonic acid group. The diazo components will be referred to in the specification and claims as ice color diazo components because of their common use in this type of colors. Diazo compounds, diazotized amines and diazo components when referred to broadly will include compounds containing more than one diazo group or more than one amino group, such as tetrazo compounds or diamines.

The present invention is based on the discovery that when diazotized amines are condensed with a saturated guanidyl sulfonic acid in which the guanidyl group has at least one reactive hydrogen attached to a nitrogen atom and capable of reacting with a diazotized amine, products are produced which will not couple with ice color coupling components in alkaline medium, but may be split by acid into their original components. Since the regenerated diazotized amine may couple with an ice color coupling component, these products are very useful in the printing of ice colors as they permit mixing with a coupling component in a stable alkaline printing paste without producing color and then to develop the print by treatment with weak acids or acid vapors in the usual manner.

The new stabilized diazo compounds of the present invention correspond to the following general formula: X—(N=N—G)$_n$ in which X is a radical of the ice color diazo component, G is a saturated guanidyl sulfonic acid radical or is its alkali metal or ammonium salts in which there are at least two carbon atoms between the guanidine radical and the nearest sulfonic acid group, and $n$ is 1 or 2.

It is not certain just where the azo group connects to the guanidine radical and the present invention is not limited to any particular theory of the formula of the compound. The following sample formula is believed to be the most probable one but it is possible that the azo group or the C=N double bond may be shifted to another nitrogen atom because of tautomerism:

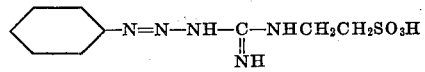

The present invention is not limited to the use of stabilized diazo compounds made from any particular saturated guanidyl sulfonic acid. On the contrary, it is generally applicable to stabilized diazo compounds made from any such saturated guanidyl sulfonic acid as long as these acids contain a reactive hydrogen atom attached to a nitrogen atom and are capable of reacting with diazotized amines such as are used as ice color components. Simple unsubstituted guanidyl sulfonic acids may be used such as e. g. guanidyl ethane sulfonic acid (guanyl taurine), guanidyl propane sulfonic acids such as alpha guanidyl propane beta sulfonic acid, 2-methyl-2-guanidyl propane sulfonic acid, guanidyl cyclohexane sulfonic acids, or n-alkyl derivatives of such acids as for instance guanyl n-methyl taurine. Polysulfonic acids may also be used such as guanyl imino diethane disulfonic acids having the following formula

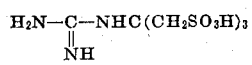

or 2-guanidyl-2-methyl propane 1-3 disulfonic acid, or guanidyl tri(sulfonmethyl) methane,

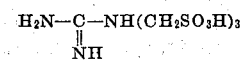

The use of the compound obtained by reacting guanidine with formaldehyde bisulfite is not claimed in this application. The constitution of this guanidine compound is not settled. It may be a guanidyl methane sulfonic acid or it may be a guanidyl methane sulfurous ester. The products obtained by reacting this compound with diazo compounds are obtained in poor yield and quality as compared with the corresponding reaction products from guanidyl alkyl sulfonic acids having more than one carbon atom such as guanyl taurine.

It is an advantage of the present invention that the new stabilized diazo compounds can be produced with practically any ice color diazo component. Typical amines which may be diazotized or tetrazotized and reacted with saturated guanidyl sulfonic acids are the following:

Aniline and its homologues, as e. g. the toluidines, 2,4-dimethylaniline; halogen derivatives of aniline and of its homologues, as e. g. the monofluoroanilines, the monochloranilines, 2,5-difluooroaniline, 2-fluoro-5-chloroaniline, 2,5-dichloroaniline, m-aminobenzotrifluoride, p-aminobenzotrifluoride, 3-amino-4-chlorobenzotrifluoride, 2-methyl-3-chloroaniline, 2-methyl-4-chloroaniline, 2-methyl-5-chloroaniline, 3-methyl-4-chloroaniline, 5-methyl-2-chloroaniline, 2-methyl-4-chloro-5-bromoaniline, 2-methyl-4,5-dichloroaniline, 4-methyl-2,5-dichloroaniline; nitro derivatives of aniline and of its homologues and their halogen derivatives, as e. g. the nitroanilines, 2-methyl-4-nitroaniline, 2-methyl-5-nitroaniline, 4-methyl-2-nitroaniline, 2-nitro-4-fluoroaniline, 2-nitro-4-chloroaniline, 3-nitro-4-chloroaniline, 4-nitro-2-chloroaniline; ether derivatives of primary aromatic amines and their halogen derivatives, as e. g. o-anisidine, 2-methoxy-5-methyl aniline, 2,5-dimethoxy-aniline, 2-methoxy-1-naphthylamine, 2-methoxy-diphenylether, 2-amino-4-acetyl-diphenylether, benzyl-2-aminophenyl-ether, 3-fluoro-4-methoxyaniline, 2-methoxy-5-chloroaniline, 2,5-dimethoxy-4-chloroaniline, 2-methoxy-4-chloro-5-methyl aniline, 2-methoxy-5-bromoaniline, 3-bromo-6-ethoxy-aniline, 4-chloro-2-amino-diphenylether, 4-amine-2-chloro-diphenylether, 4-amino-4'-chloro-diphenylether, 4,4'-dichloro-2-amino-diphenylether, 2,2',5'-trichloro-4-amino-diphenylether; ether derivatives of aniline and its homologues containing nitro groups as e. g. 2-methoxy-4-nitroaniline, 2-methoxy-5-nitroaniline, 2-nitro-4-methoxyaniline, 2-methoxy-4-nitro-5-methylaniline; monoacyl derivatives of aromatic diamines, as e.g. N-hexahydrobenzoyl-p-phenylene diamine, N-hexahydrobenzoyl-p-toluylene diamine, N-benzoyl-p-phenylene diamine; monoacyl derivatives of diamino-phenol ethers, as e. g. 2-benzoylamino-4-aminoanisole, 2-hexahydrobenzoylamine-5-aminoanisole, 2-amino-5-benzoylamine-hydroquinone dimethyl ether and diethylether, 2-amino-5-hexahydrobenzoylamine-hydroquinone dimethylether and diethylether, 2-amino-5-butyrylamino-hydroquinone dimethylether and diethylether, 2-amino-5-phenoxyacetylamine-hydroquinone diethylether, the monomethyl and the monobenzyl and the monophenyl-urethane of 2,5-diamino-hydroquinone dimethylether and diethylether, 1-amino-3-benzoylamine-4,6-dimethoxy-benzene; analogous monoacyl derivatives of 2,5-diamino-4-alkoxy-toluenes and of 2,5-diamino-4-alkoxy-chlorobenzenes and of 2,5-diamino-4-alkoxy-benzene sulfodialkylamides; analogous monoacyl derivatives of 1,3-diamino-4,6-dimethylbenzene; the diethylamide of 2-amino-4(4'-chlorophenoxy)-benzoic acid; monoacyl derivatives of diamino-p-chlorophenyl ethers as e. g. 2-amino-4-chloro-5-acetylamino-diphenylether, 2-benzoylamino-4-chloro-5-amino-anisole; amino derivatives of aromatic sulfones as e. g. 3-amino-4-methyl-diphenyl sulfone, 2-amino-4'-methyl-diphenyl sulfone, 2-amino-4-acetyl-diphenyl sulfone, the ethyl ester of 3-amino-4-(p-toluene-sulfonyl)-benzoic acid, 4-methoxy-3-amino-phenyl-ethyl sulfone, (4-methoxy-3-amino-phenyl)-benzyl sulfone, 4-ethoxy-3-amino-diphenyl sulfone, 2-amino-4-(trifluoromethyl)-phenyl-ethyl sulfone; amino derivatives of aromatic dialkylsulfonamides as e. g. 3-amino-4-methyl-benzene dimethylsulfonamide and diethylsulfonamide, 3-amino-4-methoxy-benzene diethylsulfonamide; xenylamine; alpha and beta naphthylamine; alpha aminoanthraquinone; 2-amino-3-nitro-fluorene and 2-amino-3-nitro-fluorenone; amino-diarylamines and their ether derivatives and their nitro derivatives as e. g. 2-methoxy-5-amino-diphenylamine, 4-methoxy-4'-amino-diphenylamine, 4-ethoxy-4'-amino-diphenylamine, 3,4'-dinitro-4-amino-diphenylamine; amino-azo compounds, as e. g. 3,2'-dimethyl-4-amino-azobenzene, 2-methyl-4-amino-5-methoxy-4'-chloroazobenzene, 4-amino-4'-nitro-3-methoxy-6-methyl-azobenzene, 4-amino-4'-nitro-2,5-dimethoxy-azobenzene, 4-amino-4'-chloro-3-methoxy-6-methyl-azobenzene, the azo dye: diazotized o-anisidine coupled onto alpha-naphthylamine.

There are also aromatic diamines in which only one of the amino groups is diazotized and such amino diazo compounds may also be condensed with saturated guanidyl sulfonic acids to form products of the present invention. An example of this type of amine is 2,6-dichloro-1,4-phenylene diamine. Diamines in which both amino groups are diazotized to form tetrazo compounds will also condense with the saturated guanidyl sulfonic acids. Typical amines of this class are p-phenylene, diamine, benzidine, o-tolidine, o-dianisidine, 4,4'-diamino-stilbene, 4,4'-diamino-diphenyl-amine, 2,2'-dimethyl-4,4'-diamino-diphenylamine and 1,5-diamino-naphthalene.

Diazo and tetrazo compounds of heterocyclic amines can also be condensed with saturated guanidyl sulfonic acids in accordance with the present invention. Typical heterocyclic amines are 2-amino-carbazole, 3,6-diaminocarbazole, 2-nitro-3-aminocarbazole, 2-nitro-3-aminodibenzofuran, 2-amino-3-nitrobenzothiophene, 1-amino-5-fluorobenzothiazole.

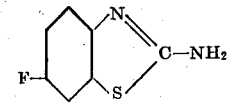

Since the stabilized diazo compounds of the present invention contain a solubilizing sulfonic group, they are soluble in aqueous alkali or in aqueous solutions of ammonia, of amines or of quaternary ammonium bases. While in the case of alkali and of the strong quaternary ammonium bases such as tetramethyl ammonium hydroxide only an equivalent amount, or a slight excess, of the base is required to promote solution, in the case of the weaker bases, such as ammonia and the various amines, a larger excess is required.

The stabilized diazo compounds used in this invention are for the most part yellow in color. They are very stable even at elevated temperatures and not explosive which is important as many diazo compounds present considerable explosion hazard. The solubility of the compounds of the present invention in solutions of bases quoted above, and the stability against hydrolysis in alkaline solutions is another important property and constitutes one advantage of the present invention.

The stabilized diazo compounds used in the present invention are split by acid in aqueous solution and regenerate the component parts of the molecules. The ease with which the compounds are split with acid will, of course, differ with different compounds, but in most cases heating with acetic acid is sufficient to effect splitting. From the practical point of view it is important that in this manner an ice color component can be converted into a very stable diazo compound from which, however, the diazotized amine may be easily regenerated by the aid of the acids.

In the present invention the reaction products of diazotized amines with saturated guanidyl sulfonic acids are not claimed. These products are claimed in our copending application, Serial No. 289,179, filed August 9, 1939.

The new stabilized diazo compounds may be combined with any of the ice color coupling components such as naphthols, pyrazolones, hydroxybenzofluorenones, benzoyl naphthols, and various N-substituted amides, particularly arylides of 2-hydroxy-3-naphthoic acid and of its 5,6,7,8-tetrahydro derivative, of 2-hydroxy-3-anthroic acid, of methyl and dimethyl salicylic acids, of hydroxy carbazole carboxylic acids, of hydroxy benzo-carbazole carboxylic acids, of acetoacetic acid, of furoyl acetic acid, of terephthaloyl-bisacetic acid, of hydroxy dibenzofuran carboxylic acids, of hydroxy dibenzothiophene-carboxylic acids, etc. The stabilized diazo compounds of the present invention are preferably used in the form of soluble salts such as alkali metal salts, ammonium salts, salts with quaternary ammonium bases, etc.

The relative proportions of the two components present in this new composition of matter may vary; however, we prefer to use approximately equivalent quantities, the coupling component being in slight excess. The mixture may contain one or more reaction products of diazotized amines with saturated guanidyl sulfonic acids and one or more ice color coupling components since desirable shades are also obtained by using more than two components.

The mixture may also contain various assistants such as starches, gums, alkali, quaternary ammonium bases, wetting and dispersing agents.

The textile material is printed or impregnated with the mixture and then treated with an acid, preferably a weak acid, at elevated temperature. By this acid treatment the diazo-guanidine compound is hydrolyzed and coupled to form the azo dye. Acetic and formic acids give very favorable results, but many other weak acids, known to those skilled in the art, may be used with equally good effect. The acids may be applied either in the liquid or vapor state.

However, the ice color coupling component and the diazo compound need not be applied simultaneously, but the diazo compound may be applied after the coupling component with the same result.

When the ice color coupling component and stable diazo compound are printed as a mixture, it is possible to effect ageing in a somewhat different manner from that described above. The goods, if sufficiently acid resistant, such as animal fibres, may be impregnated with an acid substance such as e. g. sulfuric acid, sodium bisulfate and the like. The print is then made and the material steamed. The acid in the material effects splitting and develops the color. This method of impregnating the goods with an acid is not practical with materials which are not acid resistant, such as the various cellulosic fibres. In such a case, however, it is possible to use a material which liberates acid only when treated with steam. Such potential acidic substances are e. g. sodium monochloroacetate, esters of acids that are hydrolyzed by steam such as glycerine monoacetate, ethylene monochlorhydrin, acid amides such as formamide, etc. The acid yielding material may be mixed with the printing paste, or the goods to be printed may be padded with the agent.

When the stabilized diazo compounds of the present invention are used in the form of salts with weak and volatile amines, or in solution in weak and volatile amines such as e. g. diethyl ethanolamine, the development of the color may be accomplished by steam alone without any additional acid because the steam removes the amine and decreases the alkalinity of the printing paste. Furthermore, in making up the printing paste, if insufficient amounts of base are used and some of the stabilized diazo compound and of the coupling component remains undissolved, the prints may be developed with steam alone without any addition of acid or of a potential acid substance.

The processes of this invention produce excellent dyeings and printings on textile material as no side reactions take place in the formation of the azo dye. A further advantage is that the mixtures of the diazo compounds and the ice color coupling components are preferably stable so that they may be stored without decomposition and explosion hazard. Furthermore, their alkaline printing pastes show a very high degree of stability and no premature formation of azo dyestuff takes place.

The processes of the present invention may also be used for simultaneous or separate printing with a different class of dyes, namely, the sulfuric acid esters of leuco compounds of vat dyes. It is an advantage of the present invention that composite prints are thus possible and it is not necessary to restrict the printing of goods to dyes of a single class.

Some typical mixtures of the present invention and their use in dyeing and printing textile materials will be illustrated in the following specific examples, it being understood, of course, that the invention is not broadly limited to particular details herein set forth. The parts are by weight.

*Example 1*

22.3 parts of 2-methyl-5-chloroaniline hydrochloride are stirred for ½ hour with 525 parts of water. Then 16.7 parts of 38% hydrochloric acid are added, and stirring is continued for ½ hour. The temperature is lowered to 0° C. by the addition of ice, and the mixture is diazotized with a solution containing 8.8 parts of sodium nitrite in 13 parts of water.

31.5 parts of guanyl taurine,

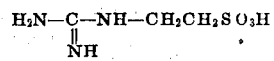

are added to the diazo solution so prepared, and 96.0 parts of 5N potassium hydroxide are added at 3° C. and the solution is allowed to stir for 6 to 8 hours. The reaction mixture is then filtered and the filtrate is treated with 70 parts of potassium carbonate for each 100 parts of solution. The precipitated solid is filtered off, pressed and dried to give a bright yellow product readily soluble in water.

5.75 parts of the product (containing 60.7% real stabilized diazo compound) are blended with 2.91 parts of 2-hydroxy-3-naphthoic acid ortho toluidide. 5 parts of the blend are dissolved by pasting with 5 parts of ethylene glycol-monoethylether, 2.5 parts of 30° Bé. sodium hydroxide, and 17.5 parts of water. The solution is thickened by addition of 70 parts of a gum starch tragacanth solution. This print paste is printed from a copper roll on cotton, the print is dried, and is developed by steam in the presence of acetic acid vapors. The developed print is rinsed with water, soaped at elevated temperature, and dried. A bright red print of very good fastness properties is obtained.

Example 2

24.4 parts of ortho dianisidine are stirred with 600 parts of water and 42 parts of 38% hydrochloric acid, and the mixture is heated to the boil to complete solution. The solution is filtered while hot, is iced to 0° C., and is tetrazotized by adding 220 parts of normal sodium nitrite solution over a period of two hours at a temperature below 5° C. The diazo solution is filtered and 40 parts of guanyl taurine are added to the filtrate, and then 105 parts of 5N potassium hydroxide are added rapidly at 3° C. This solution is allowed to stir for 6 to 8 hours, is filtered, and the filtrate is treated at 20° C. with 70 parts of potassium carbonate for each 100 parts of solution. The precipitated product is filtered, pressed and dried, yielding a brown product which is extremely soluble in water.

4.45 parts of the product (containing 72.5% of real stabilized diazo compound) are blended with 2.91 parts of 2-hydroxy-3-naphthoic acid ortho-toluidide, 0.1 part of a previously neutralized and dried sulfonated castor oil, and 2.5 parts of cane sugar. 5.0 parts of this blend, when printed on cotton in a manner similar to the procedure described in Example 1 yields a strong, blue print of fair fastness properties.

When 3.52 parts of a product (containing 91.5% real stabilized diazo compound) are blended with 3.22 parts of 2-hydroxy-3-naphthoic acid ortho-phenetidide and 1.80 parts of urea and 5 parts of this blend are printed on cotton by a similar procedure, a bright blue print is produced.

When 3.52 parts of a product (containing 91.5% of real stabilized diazo compound) are blended with 2.76 parts of 2-hydroxy-3-naphthoic acid anilide and 1.41 parts of urea and 5 parts of this blend are printed on cotton by a similar procedure, a reddish blue print is obtained.

Example 3

6.2 parts of o-dianisidine, 50 parts of water, and 32 parts of 5N hydrochloric acid are cooled to 3° C. and 3.5 parts of sodium nitrite in 7.5 parts of water are added until tetrazotization is complete. 10 parts of guanyl taurine and 35.5 parts of 5N sodium hydroxide are added slowly with stirring. After the tetrazo compound has reacted completely, the reaction mixture is filtered and the filtrate is treated with 24 parts of common salt for each 100 parts of solution. The product is extremely soluble in water.

3.2 parts of the product are blended with 2.9 parts of 2-hydroxy-3-naphthoic acid-o-toluidide. When the blend is printed on cotton according to the procedure described above under Example 1, a strong blue print is obtained.

Example 4

22.3 parts of 2-methyl-5-chloroaniline hydrochloride are diazotized in the same manner as in Example 1. 36.5 parts of 2-guanidyl-2-methyl-propane sulfonic acid,

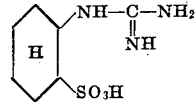

are added at 5° C. and the mixture stirred until the diazo compound has disappeared. The reaction product is then salted out by the addition of potassium carbonate, filtered off, pressed and dried.

This product, when blended with the o-phenetidide of 2-hydroxy-3-naphthoic acid and printed in a manner similar to that used in Example 1, gives a bright scarlet print of very good fastness properties.

Example 5

22.3 parts of 2-methyl-5-chloroaniline hydrochloride are diazotized as in Example 1. Then 39.3 parts of 2-guanidyl-cyclohexane sulfonic acid

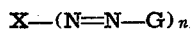

are added to the diazo solution. The solution is rendered alkaline by the addition of 96 parts of 5N potassium hydroxide solution at low temperature and the mixture is stirred until the diazo compound has disappeared. The reaction product is salted out by the addition of potassium carbonate, filtered off, pressed and dried.

This product, when blended with the o-toluidide of 2-hydroxy-3-naphthoic acid and printed in a manner similar to that described in Example 1, gives a bright red print of very good fastness properties.

What we claim is:

1. A color producing composition of matter which comprises an ice color coupling component and a stabilized diazo compound having the following general formula:

$$X-(N=N-G)_n$$

in which X is a radical of an ice color diazo component, G is a radical included in the group consisting of saturated aliphatic and cycloaliphatic guanidyl sulfonic acid radicals and their alkali metal and ammonium salts having at least two carbon atoms between the guanidine and the nearest sulfonic group, and $n$ is a whole number included in the group consisting of 1 and 2.

2. A color producing composition of matter which comprises an ice color coupling component and a stabilized diazo compound having the following general formula:

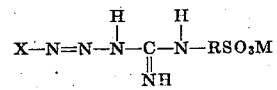

in which X is a radical of an ice color diazo component, M is a member of the group consisting of hydrogen, alkali metals and ammonium radicals, and R is a saturated aliphatic radical having at least two carbon atoms between the guanidine and the sulfonic group.

3. A color producing composition of matter which comprises an ice color coupling component and a stabilized diazo compound having the following general formula:

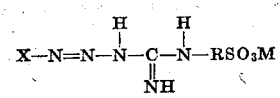

in which X is a radical of an ice color diazo component, M is a member of the group consisting of hydrogen, alkali metals and ammonium radicals and R is a saturated carbocyclic radical.

4. A color producing composition of matter which comprises an ice color coupling component and a stabilized diazo compound having the following general formula:

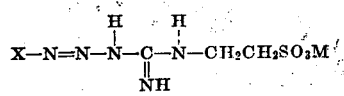

in which X is a radical of an ice color diazo component and N is a member of the group consisting of hydrogen, alkali metals and ammonium radicals.

5. A color producing composition of matter which comprises the o-toluidide of 2,3-hydroxynaphthoic acid and a stabilized diazo compound having the following general formula:

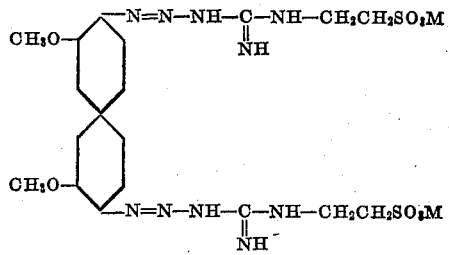

in which M is a member of the group consisting of hydrogen, alkali metals and ammonium radicals.

6. A color producing composition of matter which comprises the o-toluidide of 2,3-hydroxynaphthoic acid and a stabilized diazo compound having the following formula:

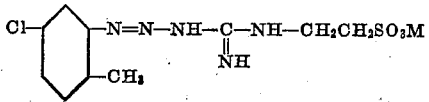

in which M is a member of the group consisting of hydrogen, alkali metals and ammonium radicals.

7. An alkaline printing paste comprising a printing thickener associated with a mixture of an ice color coupling component and a stabilized diazo compound having the following general formula: $X-(N=N-G)_n$ in which X is a radical of an ice color diazo component, G is a radical included in the group consisting of saturated guanidine sulfonic acid radicals and their alkali metal and ammonium salts having at least two carbon atoms between the guanidine and the nearest sulfonic acid group, and $n$ is a whole number included in the group consisting of 1 and 2, the paste being capable of developing color by treatment with weak acids at elevated temperature.

8. A process of coloring materials which comprises applying to the material a composition containing an ice color coupling component and a stabilized diazo compound having the following general formula: $X-(N=N-G)_n$ in which X is a radical of an ice color component, G is a radical included in the group consisting of saturated guanidine sulfonic acid radicals and their alkali metal and ammonium salts having at least two carbon atoms between the guanidine and the nearest sulfonic acid group, and $n$ is a whole number included in the group consisting of 1 and 2, and subjecting the material to the action of weak acids at elevated temperature.

9. A method of printing which comprises printing the material with an alkaline printing paste containing a mixture comprising an ice color coupling component and a stabilized diazo compound having the following general formula: $X-(N=N-G)_n$ in which X is a radical of an ice color component, G is a radical included in the group consisting of saturated guanidine sulfonic acid radicals and their alkali metal and ammonia salts having at least two carbon atoms between the guanidine and the nearest sulfonic acid group, and $n$ is a whole number included in the group consisting of 1 and 2, and developing the color by subjecting the material to the action of a weak acid at elevated temperature.

10. A method of coloring material which comprises applying to the material an ice color coupling component, then applying a dispersion of a stabilized diazo compound having the following formula: $X-(N=N-G)_n$ in which X is a radical of an ice color component, G is a radical included in the group consisting of saturated guanidine sulfonic acid radicals and their alkali metal and ammonium salts having at least two carbon atoms between the guanidine and the nearest sulfonic acid group, and $n$ is a whole number included in the group consisting of 1 and 2, and then developing the color by subjecting the material to the action of a weak acid at elevated temperature.

HANS Z. LECHER.
HENRY PHILIP OREM.